(12) United States Patent
Kikuchi

(10) Patent No.: US 12,510,896 B2
(45) Date of Patent: Dec. 30, 2025

(54) MARKING APPARATUS, CONTROL METHOD FOR MARKING APPARATUS, AND STORAGE MEDIUM

(71) Applicant: TOPCON CORPORATION, Tokyo (JP)

(72) Inventor: Takeshi Kikuchi, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 762 days.

(21) Appl. No.: 17/946,448

(22) Filed: Sep. 16, 2022

(65) Prior Publication Data

US 2023/0098171 A1    Mar. 30, 2023

(30) Foreign Application Priority Data

Sep. 24, 2021   (JP) .................. 2021-155198

(51) Int. Cl.
| | | |
|---|---|---|
| *G01C 15/02* | (2006.01) | |
| *E04G 21/18* | (2006.01) | |
| *G05D 1/00* | (2006.01) | |

(52) U.S. Cl.
CPC ........... *G05D 1/0274* (2013.01); *E04G 21/18* (2013.01); *G01C 15/02* (2013.01); *G05D 1/0214* (2013.01)

(58) Field of Classification Search
CPC .. G05D 1/0274; G05D 1/0214; G05D 1/0212; E04G 21/18; G01C 15/02; B25H 7/04; B41J 3/46; B41J 3/407

See application file for complete search history.

(56) References Cited

U.S. PATENT DOCUMENTS

| | | | | |
|---|---|---|---|---|
| 6,035,542 | A * | 3/2000 | Woznow | G01C 7/04 33/775 |
| 6,647,636 | B2 * | 11/2003 | Fukuhara | G01C 7/04 33/501.02 |
| 6,782,631 | B1 * | 8/2004 | Face, III | G01C 7/04 33/501.02 |

(Continued)

FOREIGN PATENT DOCUMENTS

| | | |
|---|---|---|
| CN | 107718896 | 2/2018 |
| EP | 3842376 A1 | 6/2021 |

(Continued)

*Primary Examiner* — Yaritza Guadalupe-Mccall
(74) *Attorney, Agent, or Firm* — Studebaker Brackett PLLC

(57) ABSTRACT

A marking apparatus includes a marking apparatus main body including a target, a traveling mechanism for automatically traveling on a traveling surface, and a printer, and a control unit configured to control the printer and the mechanism. The control unit controls the traveling so that the mechanism automatically travels along a set traveling route, the control unit compares position coordinates of the marking apparatus main body obtained from three-dimensional position coordinates of the target during traveling input at predetermined intervals with the traveling route, and corrects traveling to eliminate a deviation from the traveling route, the control unit controls the printer so as to print the marking information set at a position corresponding to the position coordinates of the marking apparatus main body, and traveling route data setting the traveling route and marking information data defining the marking information are created based on CAD design data.

18 Claims, 12 Drawing Sheets

(56) References Cited

U.S. PATENT DOCUMENTS

| | | | |
|---|---|---|---|
| 7,428,781 B2 * | 9/2008 | Wickhart | B66C 15/00 33/1 BB |
| 10,268,202 B1 * | 4/2019 | Casale | G05D 1/0282 |
| 11,733,043 B2 * | 8/2023 | Hinderling | G01C 15/006 356/4.01 |
| 2018/0328744 A1 | 11/2018 | Miyake et al. | |
| 2019/0381529 A1 | 12/2019 | Schaumberger | |
| 2020/0094577 A1 | 3/2020 | Laurance | |
| 2020/0338580 A1 | 10/2020 | Herget et al. | |
| 2021/0078319 A1 | 3/2021 | Herget et al. | |
| 2022/0099443 A1 * | 3/2022 | Nishita | G01C 15/06 |
| 2023/0098171 A1 * | 3/2023 | Kikuchi | B25H 7/04 33/1 G |
| 2023/0099546 A1 * | 3/2023 | Kikuchi | G01C 15/04 356/5.01 |
| 2023/0106629 A1 * | 4/2023 | Kikuchi | G01C 15/002 356/72 |

FOREIGN PATENT DOCUMENTS

| | | | | |
|---|---|---|---|---|
| EP | 4159379 A1 * | 4/2023 | | G01N 29/046 |
| JP | 2001-201488 A | 7/2001 | | |
| JP | 2005-054430 A | 3/2005 | | |
| JP | 2017-020972 A | 1/2017 | | |
| JP | 2017-091370 A | 5/2017 | | |
| JP | 2018-009394 A | 1/2018 | | |
| JP | 2018069531 | 5/2018 | | |
| JP | 2018-180919 A | 11/2018 | | |
| JP | 2018-200217 A | 12/2018 | | |
| JP | 2019-031901 A | 2/2019 | | |
| JP | 2020-060018 A | 4/2020 | | |
| JP | 2021011772 | 2/2021 | | |
| JP | 2021-043114 A | 3/2021 | | |
| JP | 2021-102501 A | 7/2021 | | |
| WO | 2008/038960 A1 | 4/2008 | | |
| WO | 2020167298 | 8/2020 | | |

* cited by examiner

MARKING APPARATUS, CONTROL METHOD FOR MARKING APPARATUS, AND STORAGE MEDIUM

CROSS-REFERENCE TO RELATED APPLICATION, BENEFIT CLAIM, AND INCORPORATION BY REFERENCE

The present disclosure claims priority under 35 U.S.C. § 119 to Japanese Patent Application No. 2021-155198 filed Sep. 24, 2021. The contents of this application are incorporated herein by reference in their entirely.

TECHNICAL FIELD

The present invention relates to a technology to automate a marking work, more specifically, to a marking apparatus that prints marking information on a design drawing onto a traveling surface, a control method for the marking apparatus, and a storage medium including a program for the marking apparatus.

BACKGROUND ART

At a construction site, a marking work is performed for various kinds of work such as foundation work, construction of structure, interior and exterior construction, fitting work, and equipment work. "Marking" is work to draw a design drawing on a site in actual size, and mark information on marking positions such as base lines of walls and pillars, pillar sizes, a next wall position, and installation positions of equipment, etc., and equipment to be installed, onto a floor surface or a wall surface.

In recent years, a marking apparatus that includes a traveling mechanism and a printer and automates a marking work has been proposed (for example, refer to Patent Literature 1). The marking apparatus of Patent Literature 1 travels to a marking position and can print an arbitrary marking line and related information onto the marking position within a two-dimensional region inside an apparatus frame by freely moving the printer by using an XY actuator inside the apparatus frame near the marking position.

CITATION LIST

Patent Literature

Patent Literature 1: Japanese Published Unexamined Patent Application No. 2019-31901

SUMMARY OF INVENTION

Technical Problem

However, the marking apparatus of Patent Literature 1 has a problem in which the marking apparatus is manually moved to each marking position, and then measures a position and a posture of the marking apparatus and calculates position coordinates, and performs printing, so that the marking work becomes complicated. Therefore, automatic continuous marking of the entire site or one section has been desired.

The present invention was made in view of the above circumstances, and an object thereof is to provide a marking apparatus and a control method for the marking apparatus to enable automatic continuous marking of the entire site or a predetermined range.

Solution to Problem

In order to achieve the object described above, a marking apparatus according to an aspect of the present invention includes a marking apparatus main body including a target, a traveling mechanism for automatically traveling on a traveling surface, and a printer configured to print marking information onto the traveling surface, and a control unit including at least a processor and a memory, the control unit configured to control the printer and the traveling mechanism, wherein the control unit controls the traveling mechanism so that the traveling mechanism automatically travels along a set traveling route, the control unit compares position coordinates of the marking apparatus main body obtained from three-dimensional position coordinates of the target during traveling input at predetermined intervals with the traveling route, and corrects traveling to eliminate a deviation from the traveling route, the control unit controls the printer so as to print the marking information set at a position corresponding to the position coordinates of the marking apparatus main body, and traveling route data setting the traveling route and marking information data defining the marking information are created based on CAD (Computer Aided Design) design data.

A control method for a marking apparatus, according to another aspect of the present invention is a control method for a marking apparatus including a marking apparatus main body including a target, a traveling mechanism for traveling on a traveling surface, and a printer configured to print a mark and information related to the mark onto the traveling surface, and a control unit including at least a processor and a memory, the control unit configured to control the printer and the traveling mechanism, wherein the control unit controls the traveling mechanism so that the traveling mechanism travels along a set traveling route, the control unit compares position coordinates of the marking apparatus main body obtained from three-dimensional position coordinates of the target during traveling with the traveling route, and corrects traveling to eliminate a deviation from the traveling route, the control unit controls the printer so as to print the marking information set at a position corresponding to the position coordinates of the marking apparatus main body, and traveling route data setting the traveling route and marking information data defining the marking information are created based on CAD design data.

A storage medium according to still another aspect of the present invention, for causing a computer that is the control unit of the marking apparatus, to perform the control method for a marking apparatus according to the aspect described above.

Benefits of Invention

The marking apparatus and the marking method for the marking apparatus configured as described above enables automatic continuous marking of the entire site or a predetermined range.

DESCRIPTION OF EMBODIMENTS

Hereinafter, a preferred embodiment of the present invention will be described with reference to the drawings, however, the present invention is not limited to this. The same configuration common to the embodiment and respective modifications will be provided with the same reference signs, and overlapping description will be omitted as appropriate.

Embodiment(s)

1. Marking System S

Figure 1:
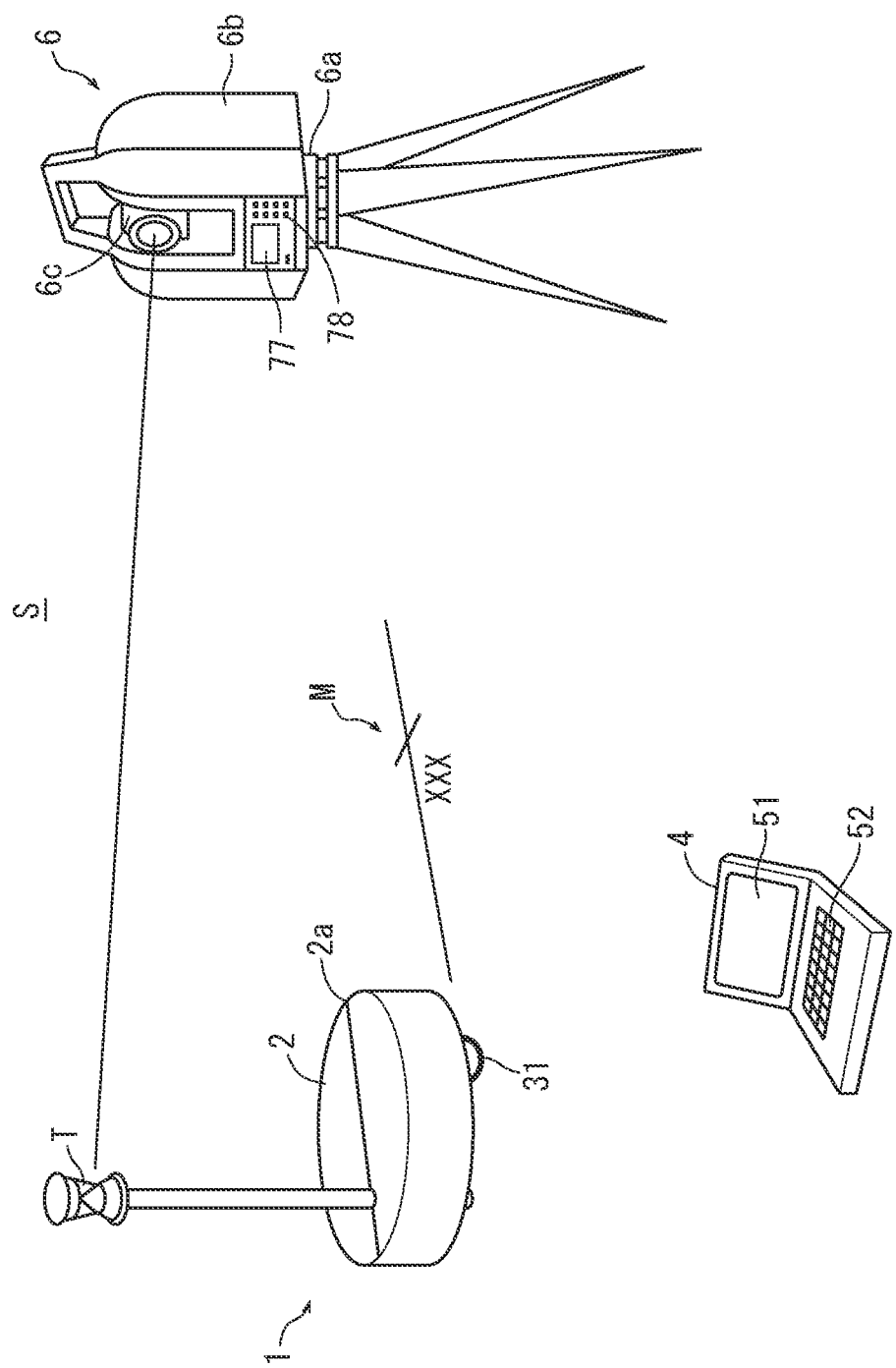
FIG. 1 is a view illustrating an outline of a marking system according to an embodiment of the present invention.
Figure 2:
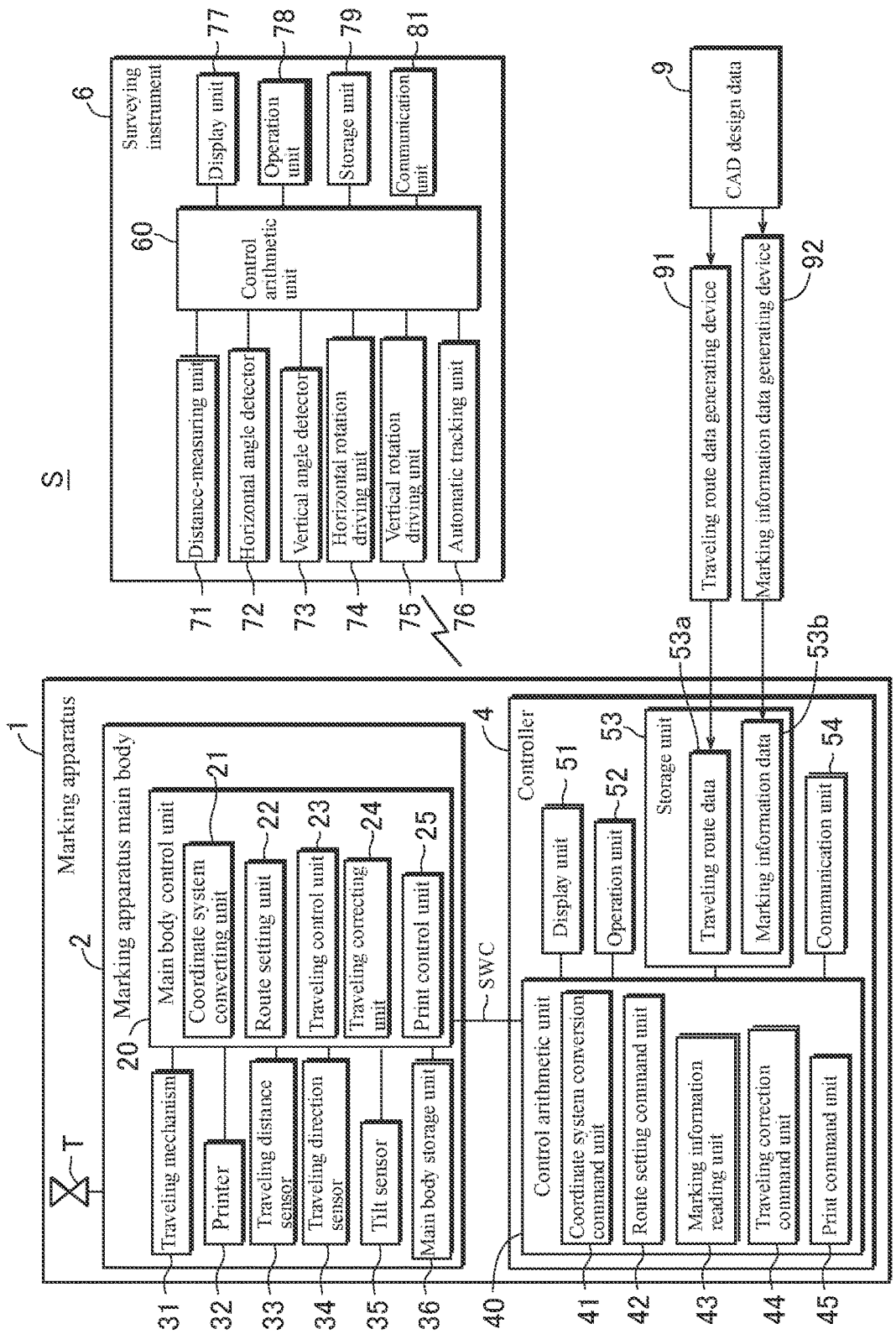
FIG. 2 is a configuration block diagram of the same marking system.

FIG. 1 is a schematic external view of a marking system (hereinafter, also simply referred to as "system") S according to an embodiment of the present invention. The system S includes a marking apparatus 1 and a surveying instrument 6. FIG. 2 is a configuration block diagram of the marking apparatus 1 and the surveying instrument 6 constituting the system S.

The system S causes a marking apparatus main body (hereinafter, simply referred to as "apparatus main body") 2 including a target T to automatically travel along a traveling route while confirming three-dimensional position coordinates of the target T (hereinafter, referred to as "target position coordinates") by the surveying instrument 6, and can print desired marking information onto a traveling surface. This requires traveling route data 53a and marking information data 53b illustrated in FIG. 2 that are created from CAD (Computer • Aided • Design) design data 9.

First, the traveling route data 53a and the marking information data 53b will be described. In this description, "CAD design data 9" is design drawing data of a work site, a construction object, and a structure, etc., created by a computer such as a personal computer. For example, the CAD design data 9 is preferably in a general-purpose CAD data format such as DXF (registered trademark) format. Alternatively, the CAD design data may be created by converting a drawing in the PDF (registered trademark) format, etc., into the DXF format. The CAD design data 9 is created by using an absolute coordinate system such as a map coordinate system.

The marking information data 53b is data including coordinates of marking positions included in the CAD design data 9, and information on points, straight lines, figures, characters, and symbols, etc., to be printed at the marking positions. The marking information data 53b defines marking information to be printed onto a traveling surface. As marking information may include, for example, information related to reference lines and marking positions of a "base line" that is a straight line representing a centerline of a pillar or wall, a "relief line" that is a straight line at a certain distance from the base line, and a "pillar centerline" having a cross shape representing a pillar position. Information related to marking positions may include characters, numbers, patterns, symbols, etc., to be marked in a general marking work. In addition, the information related to marking positions may include a model number of the equipment or fitting to be used at the position, an ID (identifier) of an apparatus to be used at the position, and a name of a person in charge of the work, etc. In this description, marking information printed on a traveling surface is referred to as "mark." The marking information data 53b is created based on the CAD design data 9 by using a marking information data generating device 92 that is a computer including at least a processor such as CPU and a memory. In the process of generation, a designer or a worker can optionally add necessary marking information.

Figure 12A:
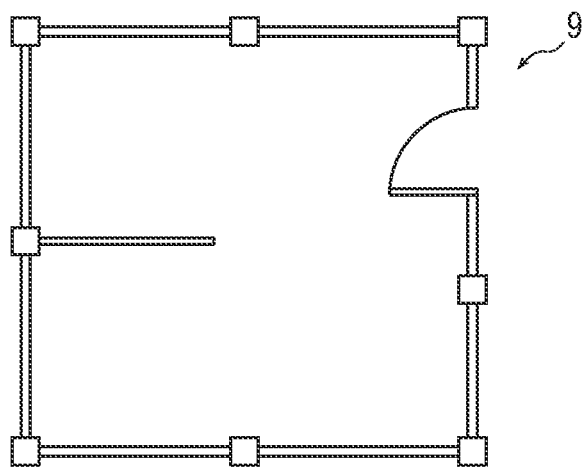
FIGS. 12A, 12B, and 12C are diagrams describing CAD design data, marking information data, and traveling route data.
Figure 12B:
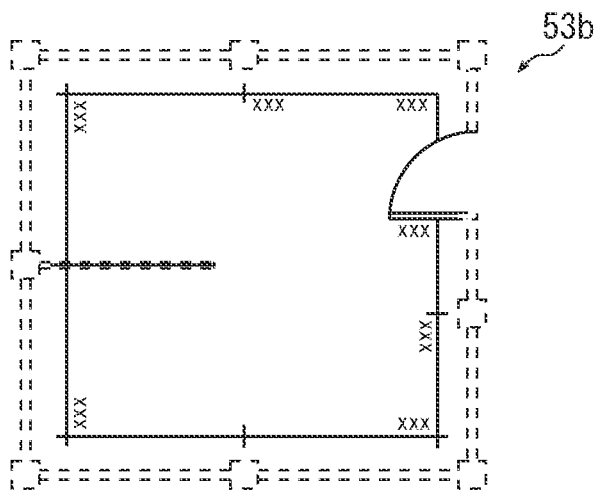
Figure 12C:
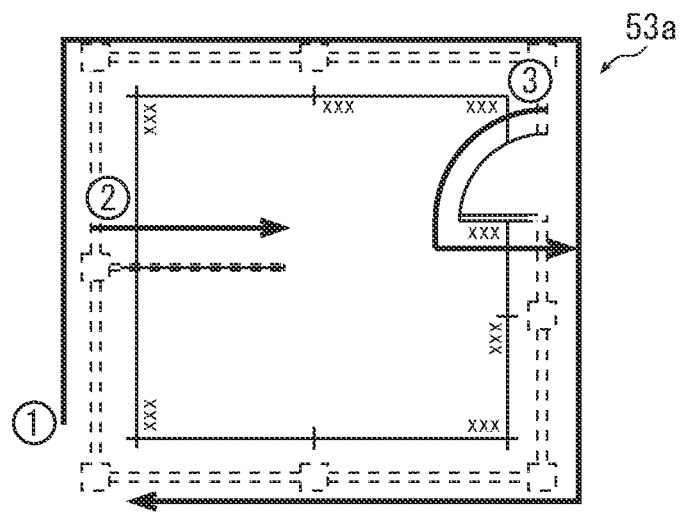

The traveling route data 53a is data setting a traveling route of the marking apparatus so that the marking apparatus passes through all marking positions of the entire site or a predetermined range. The predetermined range is, for example, a range which includes no barriers or steps that hinder continuity of a plane that the apparatus main body 2 travels on, and the apparatus main body 2 can automatically travel on. For example, in the case where FIG. 12B illustrates the marking information data 53b generated based on the CAD design data 9 in FIG. 12A, the traveling route data 53a may be configured by a combination of unicursal routes as represented by circled numbers 1 to 3 in FIG. 12C. The traveling route data 53a may be created by, for example, specifying unicursal routes with a pointer, etc., of a mouse by a worker. Alternatively, the traveling route data 53a may be generated by combining unicursal routes by automatic calculation. The traveling route data 53a is generated from the CAD design data 9 in the same coordinate system by using the traveling route data generating device 91 that is a computer including at least a processor such as a CPU and a memory.

2. Marking Apparatus 1

The marking apparatus 1 includes the apparatus main body 2 and a controller 4. The apparatus main body 2 and the controller 4 are connected by SWC (Short-range Wireless Communication) such as infrared communication, Bluetooth (registered trademark), or Wi-Fi, and can input and output information to each other.

2-1. Apparatus Main Body 2

The apparatus main body 2 has a thick disc-shaped housing 2a, and is configured as a mobile body that automatically travels on a traveling route by a rotating body constituting a traveling mechanism 31.

On an upper surface of the housing 2a, a pole 2b as a target support member is erected, and the target T is attached to an upper end portion of the pole 2b. The target T is a so-called 360-degree prism configured by radially combining a plurality of triangular-pyramid-shaped prisms, and retro-reflects light incident from the entire circumference (360°) toward a direction opposite to an incident direction of the light.

As illustrated in FIG. 2, the apparatus main body 2 includes the target T, a main body control unit 20, the traveling mechanism 31, a printer 32, a traveling distance sensor 33, a traveling direction sensor 34, a tilt sensor 35, and a main body storage unit 36.

Figure 3A:
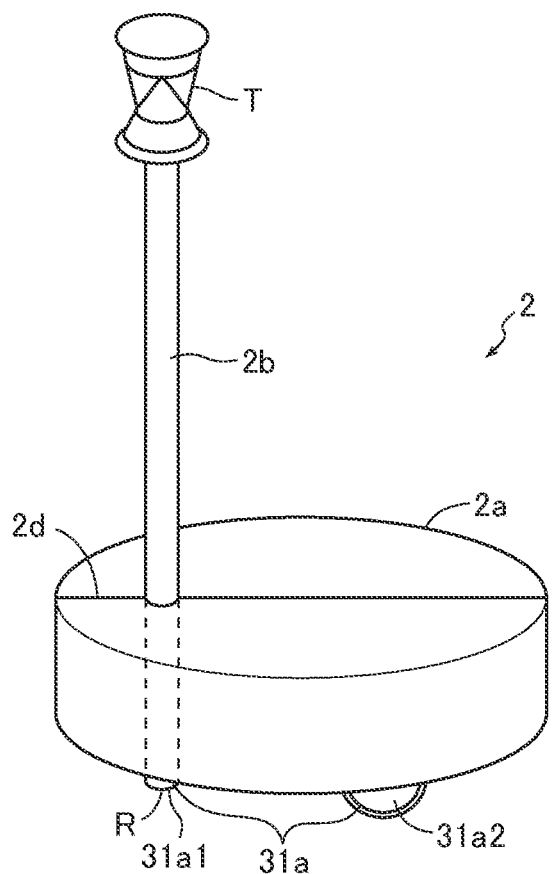
FIG. 3A is a perspective view of a marking apparatus constituting the marking system according to the same embodiment.
Figure 3B:
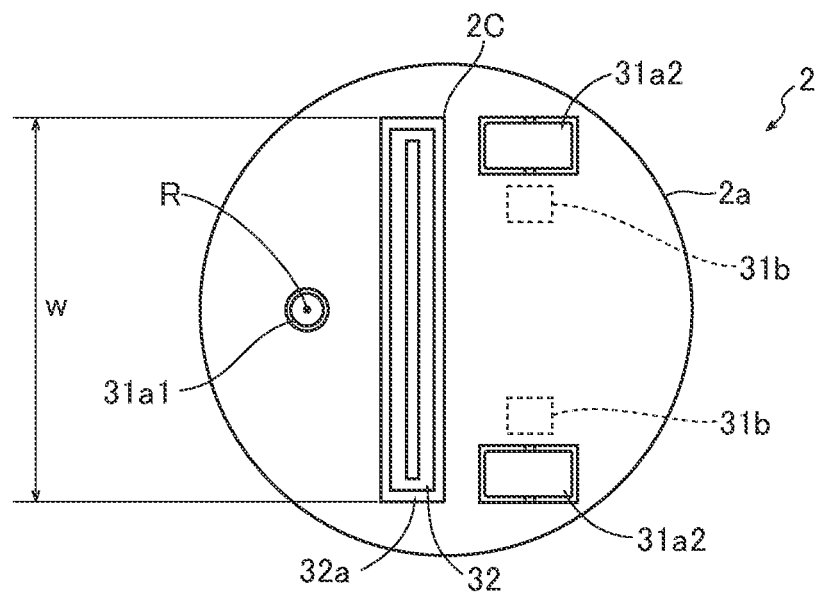
FIG. 3B is a bottom view of the same.

On a lower portion of the housing 2a, the traveling mechanism 31 is provided. The traveling mechanism 31 includes a rotating body 31a and a traveling motor 31b. In the present embodiment, as illustrated in FIG. 3B, as the rotating body 31a, one front wheel 31a1 and a pair of rear wheels 31a2 provided left and right to face each other are provided. The front wheel 31a1 is a ball caster movable in 360-degree directions by a bearing. Alternatively, the front wheel 31a1 may be a general universal caster. The rear wheels 31a2 are wheels (rollers), and are rotatable independently of each other around a rotary shaft provided orthogonal to a traveling direction when traveling straight.

Each rear wheel 31a2 includes an independent traveling motor 31b to be controlled by a traveling control unit 23. By combining forward/rearward rotations of the respective rear wheels 31a2, the apparatus main body 2 move toward an arbitrary direction. When both rear wheels are rotated forward, the apparatus main body 2 travels forward, and when the rear wheels are rotated in reverse, the apparatus main body 2 travels backward. When one of the rear wheels is rotated forward and the other is rotated in reverse, the apparatus main body 2 turns. The configuration of the traveling mechanism 31 is not limited to this. The traveling mechanism 31 may be configured to include two pairs of wheels respectively provided front and rear and connected by shafts, and one of the front and rear shafts includes a steering mechanism to enable traveling in an arbitrary direction. The traveling mechanism 31 may also be configured as a continuous track such as a crawler.

The housing 2a is adjusted so that an upper surface becomes horizontal when the apparatus main body 2 is placed on a horizontal plane. The pole 2b is provided orthogonal to the upper surface of the housing 2a. The target T is attached just above the front wheel 31a1. Coordinates of a ground contact point R of the front wheel just below the target T are handled as position coordinates of the apparatus main body 2 that are obtained based on target position coordinates.

On the upper surface of the housing 2a, a reference direction line 2d is provided. The reference direction line 2d is a line representing the reference direction of the apparatus main body 2.

The printer 32 is a so-called ink-jet printer. The printer 32 includes at least a printer head 32a, and an operation mechanism and an ink tank not illustrated. The printer 32 is provided inside the housing 2a. The printer 32 is configured so that, as illustrated in FIG. 3B, an ink discharge portion of the printer head 32a which has a wide printing width w almost covering a left-right direction (X direction) of the housing 2a is exposed from an opening 2c provided in a bottom surface of the housing 2a. The printer head 32a is designed so that it has an appropriate short distance from a traveling surface to print onto the traveling surface. As for the printer head 32a, a publicly known configuration may be applied.

Figure 7A:
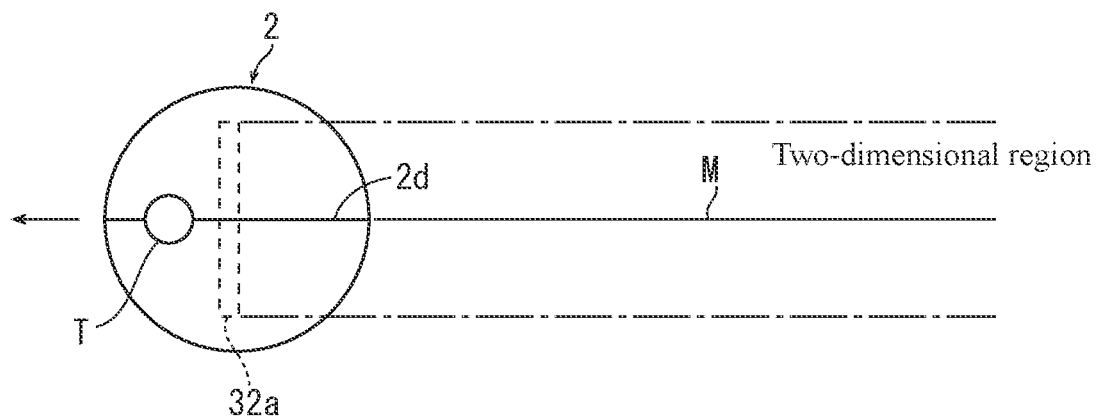
FIGS. 7A, 7B, and 7C are diagrams illustrating examples of marks printed by the same marking method.
Figure 7B:
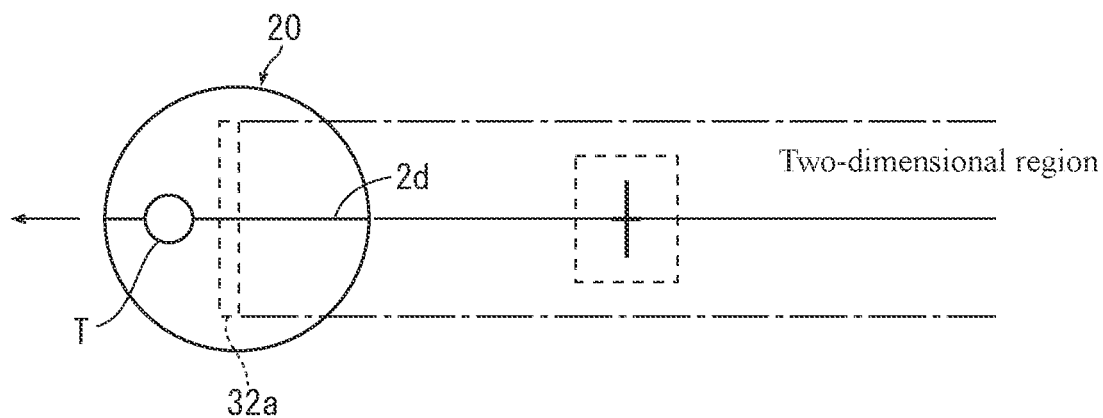
Figure 7C:
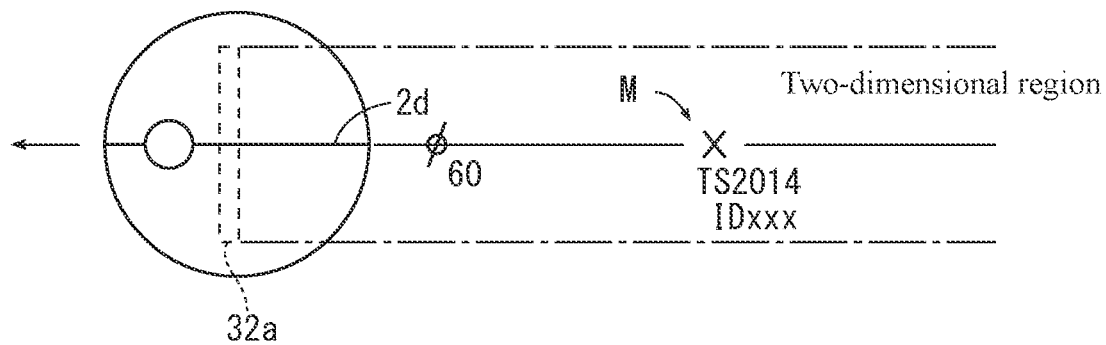

Positional relationships of the target T with respective positions of the printer head 32a of the printer 32 are known. Along with forward movement of the apparatus main body 2, the printer 32 is controlled so that the printer head 32a discharges ink to a designated position. Accordingly, as illustrated in FIGS. 7A to 7C, designated marking information can be printed on a desired position designated according to the marking information data 53b inside a two-dimensional region defined by the printing width of the printer head 32a and a traveling route.

The traveling distance sensor 33 is, for example, a rotary encoder provided in the rotating body 31a of the traveling mechanism 31, and detects a traveling distance of the apparatus main body 2 from the number of rotations of the rotating body 31a. It is also possible that rotary encoders are attached to both rear wheels 31a2 and an average traveling distance of these is calculated to improve the accuracy. Alternatively, it is also possible that a GNSS device capable of detecting its own position based on a navigation signal of a navigation satellite is used to measure its own position as the traveling distance sensor, and a difference in position between before and after a predetermined time elapses is detected as a traveling distance.

The traveling direction sensor 34 is a triaxial accelerometer or a triaxial gyro sensor, and detects a traveling direction of the apparatus main body 2. The traveling direction sensor 34 is set so that its reference direction matches the reference direction line 2d provided on the housing 2a.

The tilt sensor 35 is, for example, an electronic tilt sensor, and is provided in relation to two axes of an X-axis direction (left-right direction of the apparatus main body) and a Y-axis direction (front-rear direction of the apparatus main body) inside the housing 2a or near the target T. The tilt sensor 35 outputs a detection result to the controller 4 at timings synchronized with timings of the measurements of the target T by the surveying instrument 6.

The main body control unit 20 is a so-called microprocessor including at least a processor, for example a CPU (Central Processing Unit), and a memory (a RAM (Random Access Memory)). The main body control unit 20 includes a coordinate system converting unit 21, a route setting unit 22, a traveling control unit 23, a traveling correcting unit 24, and a print control unit 25.

The coordinate system converting unit 21 converts a traveling position and a direction of the reference direction line of the apparatus main body 2 calculated by the apparatus main body 2 into the same absolute coordinate system as the CAD design data 9 according to a coordinate system conversion command from the controller 4. Current position coordinates of the apparatus main body 2 are converted into coordinates calculated from input target position coordinates and a value of the tilt sensor 35, and a value of the traveling direction sensor can be converted into a direction in the absolute coordinate system from a direction angle obtained from a measurement of the target T. Accordingly, the obtained traveling position and direction of the apparatus main body 2 are converted into values in the absolute coordinate system and handled.

The route setting unit 22 sets the traveling route data 53a received from the controller 4 as a traveling route of the apparatus main body 2.

The traveling control unit 23 calculates a traveling position of the apparatus main body 2 based on detection results of the traveling distance sensor 33 and the traveling direction sensor 34, and controls traveling of the traveling mechanism 31 to eliminate a deviation between the traveling position and the traveling route, so that the traveling mechanism 31 travels along the set traveling route. In addition, the traveling control unit 23 controls traveling of the traveling mechanism 31 so that the traveling mechanism 31 travels at a fixed speed in principle.

The traveling correcting unit 24 controls driving of the traveling motor 31b of the traveling mechanism 31 according to a traveling correction command based on target position coordinates received from the controller 4.

The print control unit 25 prints marking information that is included in the marking information data 53b and set at a position corresponding to the position of the apparatus main body 2 based on the target position coordinates onto a traveling surface based on a print control command input from the controller 4.

2-2. Controller 4

The controller 4 has, for example, a basic configuration of a computer terminal such as a personal computer, a PDA (Personal Digital Assistant), a tablet terminal, a smartphone, etc. A laptop computer is used in the illustrated example. The controller 4 includes at least a control arithmetic unit 40, a display unit 51, an operation unit 52, a storage unit 53, and a communication unit 54. The controller 4 serves as a remote controller to remotely operate the apparatus main body 2.

The display unit 51 is, for example, a liquid crystal display. The operation unit 52 is, for example, a keyboard, a mouse, etc., and enables various inputs, selections, and determinations, etc. The display unit 51 and the operation unit 52 may be integrally configured as a touch panel display.

The storage unit 53 is a nonvolatile storage such as an HDD(Hard•Disc•Drive) or SSD(Solid•State•Drive). The storage unit 53 may be partially configured by an external storage device such as a USB flash memory. The storage unit 53 has at least the traveling route data 53a and the marking information data 53b. In addition, the storage unit 53 stores programs for causing the control arithmetic unit 40 to execute functions of the controller 4.

The communication unit 54 enables wireless information transmission and reception between the apparatus main body 2 and the surveying instrument 6. As a communication means, Wi-Fi, Bluetooth (registered trademark), infrared communication, a cell-phone network, etc., can be used. Communication with the surveying instrument 6 may be wire communication.

The control arithmetic unit 40 is a control arithmetic unit that includes at least a processor such as CPU and a memory. The Processor reads a program stored in the storage unit 53 into the memory and executes it. The control arithmetic unit 40 is a control arithmetic unit that includes at least a processor such as CPU and a memory. The Processor reads a program stored in the storage unit 53 into the memory and executes it. The control arithmetic unit 40 includes, as functional units, a coordinate system conversion command unit 41, a route setting command unit 42, a marking data reading unit 43, a traveling correction command unit 44, and a print command unit 45.

The coordinate system conversion command unit 41 is installed at a known point, and sets a direction angle of the reference direction line 2d calculated by measuring the target T with the surveying instrument 6 whose direction angle is known as a reference direction in the traveling direction sensor 34 of the apparatus main body 2, and accordingly, subsequently commands the apparatus main body 2 to convert coordinates and a direction of a traveling position of the apparatus main body 2 calculated by the apparatus main body 2 into values in the absolute coordinate system.

The route setting command unit 42 commands the apparatus main body 2 to set the traveling route data 53a read from the storage unit 53 as a traveling route.

The marking data reading unit 43 reads the marking information data 53b from the storage unit 53.

The traveling correction command unit 44 calculates position coordinates of the apparatus main body 2 from target position coordinates input from the surveying instrument 6 and calculates a deviation of the position coordinates of the apparatus main body 2 from the traveling route, and commands the apparatus main body 2 to correct traveling control to eliminate the deviation.

The print command unit 45 commands the apparatus main body 2 to print marking information to be marked and printed onto a marking position when the apparatus main body 2 arrives at the marking position on the traveling route.

The functions of these functional units may be implemented hardware-wise in circuits and programmable logic devices, or may be implemented software-wise by programs. When the functions are implemented by programs, these programs may be stored in a computer-readable storage medium such as a CD (Compact Disc), a DVD (Digital Versatile Disc), a Blu-ray (registered trademark) disc, and distributed.

In addition to the functions described above, the controller 4 is provided with various functions to perform remote operations to cause the apparatus main body 2 to move forward, move backward, turn right, turn left, stop, and move to a designated position, and cause equipped detecting devices to output detection values to the controller 4 according to a worker's instruction.

As described above, in this system S, the main body control unit 20 and the control arithmetic unit 40 cooperatively function as a control unit of the marking apparatus 1.

3. Surveying Instrument 6

The surveying instrument 6 is a motor-driven total station having an automatic tracking function. The surveying instrument 6 includes, in appearance, a base portion 6a provided on a leveling device, a bracket portion 6b that rotates horizontally on the base portion 6a, a telescope 6c that rotates vertically at the center of the bracket portion 6b, and a display unit 77 and an operation unit 78 provided on a front surface of the bracket portion 6b.

The surveying instrument 6 includes a control arithmetic unit 60, a distance-measuring unit 71, a horizontal angle detector 72, a vertical angle detector 73, a horizontal rotation driving unit 74, a vertical rotation driving unit 75, an automatic tracking unit 76, the display unit 77, the operation unit 78, a storage unit 79, and a communication unit 81.

The distance-measuring unit 71 emits distance-measuring light such as an infrared laser toward the target T, and receives reflected light to measure a distance to the target T.

The horizontal angle detector 72 detects a rotation angle of the bracket portion 6b in the horizontal direction, and the vertical angle detector 73 detects a rotation angle of the telescope 6c in the vertical direction. Accordingly, an angle of an optical axis of the distance-measuring light, that is, an angle of the target T is measured. The horizontal rotation driving unit 74 and the vertical rotation driving unit 75 are motors that are controlled by the control arithmetic unit 60 and respectively drive a horizontal rotation shaft and a vertical rotation shaft.

The automatic tracking unit 76 outputs, as tracking light, an infrared laser, etc., of a wavelength different from that of the distance-measuring light and receives reflected light by an image sensor such as a CCD sensor or CMOS sensor, and acquires a landscape image including the tracking light and a landscape image excluding the tracking light. The control arithmetic unit 60 detects a position of the target T from a difference between these images, and performs automatic tracking so that the telescope 6c always faces the target T.

The display unit 77 and the operation unit 78 are user interfaces of the surveying instrument 6, and these units can execute functions such as command and setting of a surveying operation, and confirmation of an operation status and measurement results.

The storage unit 79 consists of, for example, a memory card, an HDD, etc. The storage unit 79 stores various programs for realizing various functions including a distance-measuring program of the surveying instrument 6. In addition, the storage unit 79 stores various information acquired by the control arithmetic unit 40.

The communication unit 81 enables wireless communication with the controller 4 by using the same communication system. Target position coordinates calculated under control of the control arithmetic unit 60 are transmitted to the controller 4 at predetermined intervals.

The control arithmetic unit 40 is a microcontroller configured by mounting a CPU, a ROM, a RAM, etc., on an integrated circuit. The control arithmetic unit 40 controls the rotation driving units 74 and 75 and controls the distance-measuring unit 71 and the automatic tracking unit 76. The control arithmetic unit 40 calculates target position coordinates from results of distance and angle measurements of the target T. The control arithmetic unit 40 automatically tracks the target T, and according to a command of the controller 4, at predetermined intervals, performs distance and angle measurements of the target T and transmits target position coordinates to the controller 4.

The surveying instrument 6 is not limited to a total station, and various surveying apparatuses capable of acquiring three-dimensional position coordinates of a target, such as a scanner device having an automatic tracking function and a target scanning function, can be applied.

4. Marking Method

Next, a marking method using the system S (that is, a control method for the marking apparatus 1) will be described.

Figure 4:
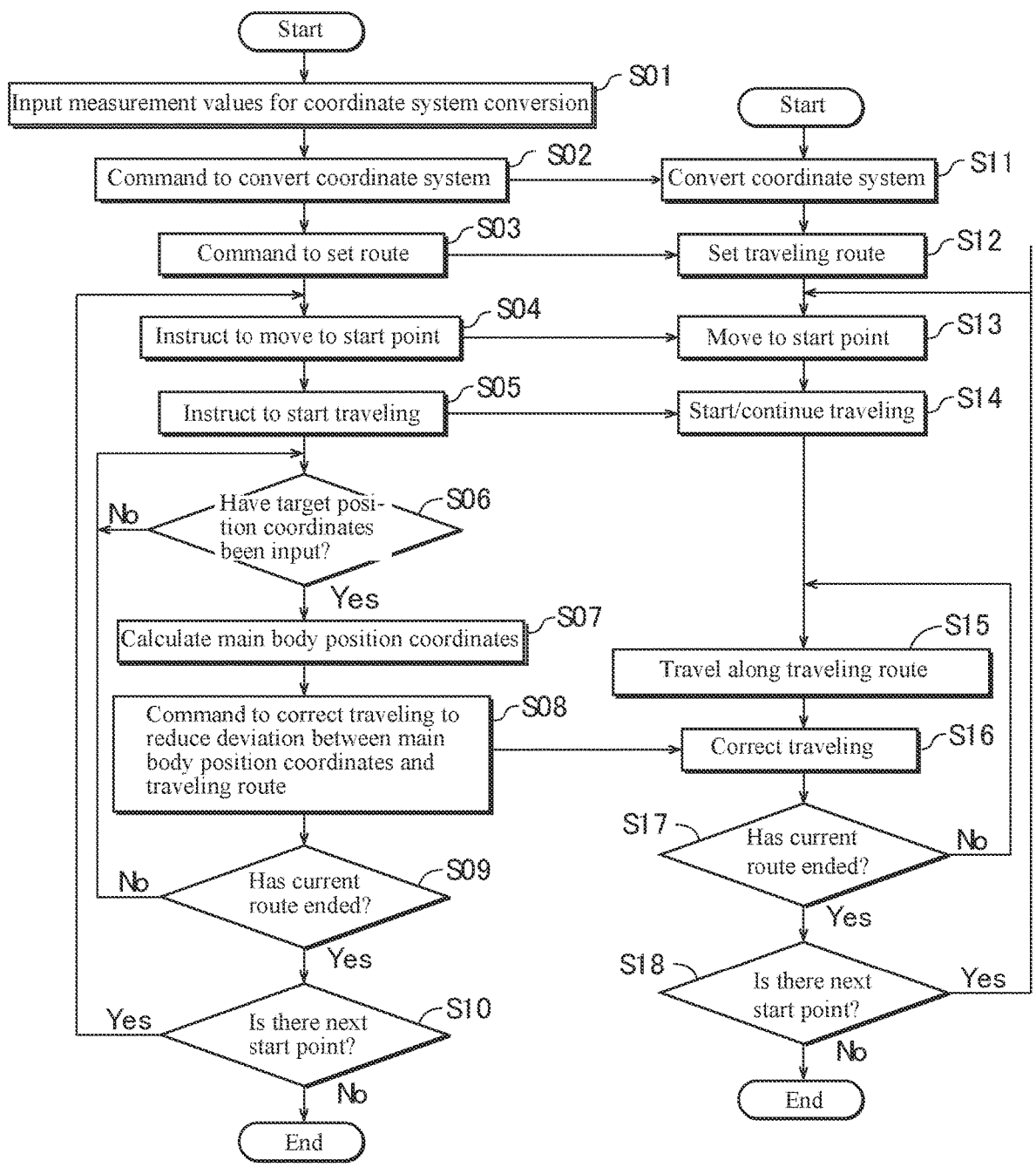
FIG. 4 is a flowchart of processing of the marking apparatus in a marking method using the same marking system.

FIG. 4 is a flowchart describing processing related to traveling control of the marking apparatus 1. Steps S01 to S03 are performed as on-site initial settings.

First, in Step S01, a worker inputs measurement values for conversion of an internal coordinate system of the apparatus main body 2 into an absolute coordinate system of the CAD design data 9 from the operation unit 52 of the controller 4. For this operation, the surveying instrument 6 is installed at a known point (point whose coordinates are known in the absolute coordinate system) to measuring another known point so that coordinates and a direction angle of the surveying instrument 6 are made known. The apparatus main body 2 is installed at an arbitrary point in a construction site. At this time, the reference direction line 2d of the marking apparatus provided on the housing of the apparatus main body 2 is set toward a collimation axis of the surveying instrument 6.

An installation point of the apparatus main body 2 is preferably near a start point of a traveling route. Here, by using the surveying instrument 6 whose direction angle has been known from the known point, that is, converted into the absolute coordinate system, distance and angle measurements are performed, and target position coordinates are calculated. In addition, from the known point and the target position coordinates, a direction angle of the reference direction line 2d is calculated. The worker inputs obtained three-dimensional position coordinates of the known point and direction angle of the reference direction line 2d via the operation unit of the controller 4.

Next, in Step S02, the coordinate system conversion command unit 41 accepts and sets the calculated position coordinates of the known point and the direction angle of the reference direction line 2d, and commands the apparatus main body 2 to convert the internal coordinate system of the apparatus main body 2 into the absolute coordinate system.

Next, in Step S03, the route setting command unit 42 reads the traveling route data 53a from the storage unit 53 and outputs it to the apparatus main body 2, and commands the apparatus main body 2 to set the traveling route data 53a as a traveling route. In response to this, in Step S12, the route setting unit 22 of the apparatus main body 2 sets the traveling route of the traveling route data 53a as a traveling route.

Next, in Step S04, when an instruction to move to a start point is input by the worker, in Step S13, the apparatus main body 2 moves to the start point according to control of the traveling control unit 23, and stops so that a front end is directed toward a traveling direction.

Next, in Step S05, when a traveling start instruction is input by the worker, in Step S14, the apparatus main body 2 starts to travel along the traveling route. At the same time, the controller 4 commands the surveying instrument 6 to transmit target position coordinates being tracked at predetermined intervals. At the same time, the controller 4 commands the tilt sensor 35 of the apparatus main body 2 to output a value of the tilt sensor at predetermined intervals synchronized with the measurements of the surveying instrument.

When traveling starts in Step S14, while acquiring values of the traveling distance sensor 33 and the traveling direction sensor 34, the traveling control unit 23 controls the traveling mechanism 31 so that it travels along the set traveling route in Step S15.

Meanwhile, in the controller 4, when target position coordinates and a value of the tilt sensor 35 are input (Yes) in Step S06, the traveling correction command unit 44 calculates position coordinates of the apparatus main body 2 (position coordinates based on the target position coordinates) in Step S07. Next, in Step S08, the traveling correction command unit 44 calculates a deviation between the position coordinates of the apparatus main body 2 and the traveling route, and transmits a traveling correction command to feedback-control the traveling mechanism 31 to the apparatus main body 2 so as to eliminate the deviation.

Subsequently, in the apparatus main body 2, upon accepting the traveling correction command in Step S16, traveling is corrected according to the traveling correction command.

Then, the apparatus main body 2 repeats Steps S15 to S17 until the current route (for example, route 1 in the example illustrated in FIG. 12C) ends in Step S17.

When the current route ends, it is determined whether there is a start point of a next route at the construction site, and until all routes end, Steps S13 to S18 are repeated.

Similarly, in the controller 4, Steps S06 to S09 are repeated until the current route (for example, route 1 in the example illustrated in FIG. 12C) ends in Step S09.

When the current route ends, it is determined whether there is a start point of a next route (route 2 in the example illustrated in FIG. 12C) at the construction site, and until all routes end, Steps S04 to S10 are repeated.

Figure 5:
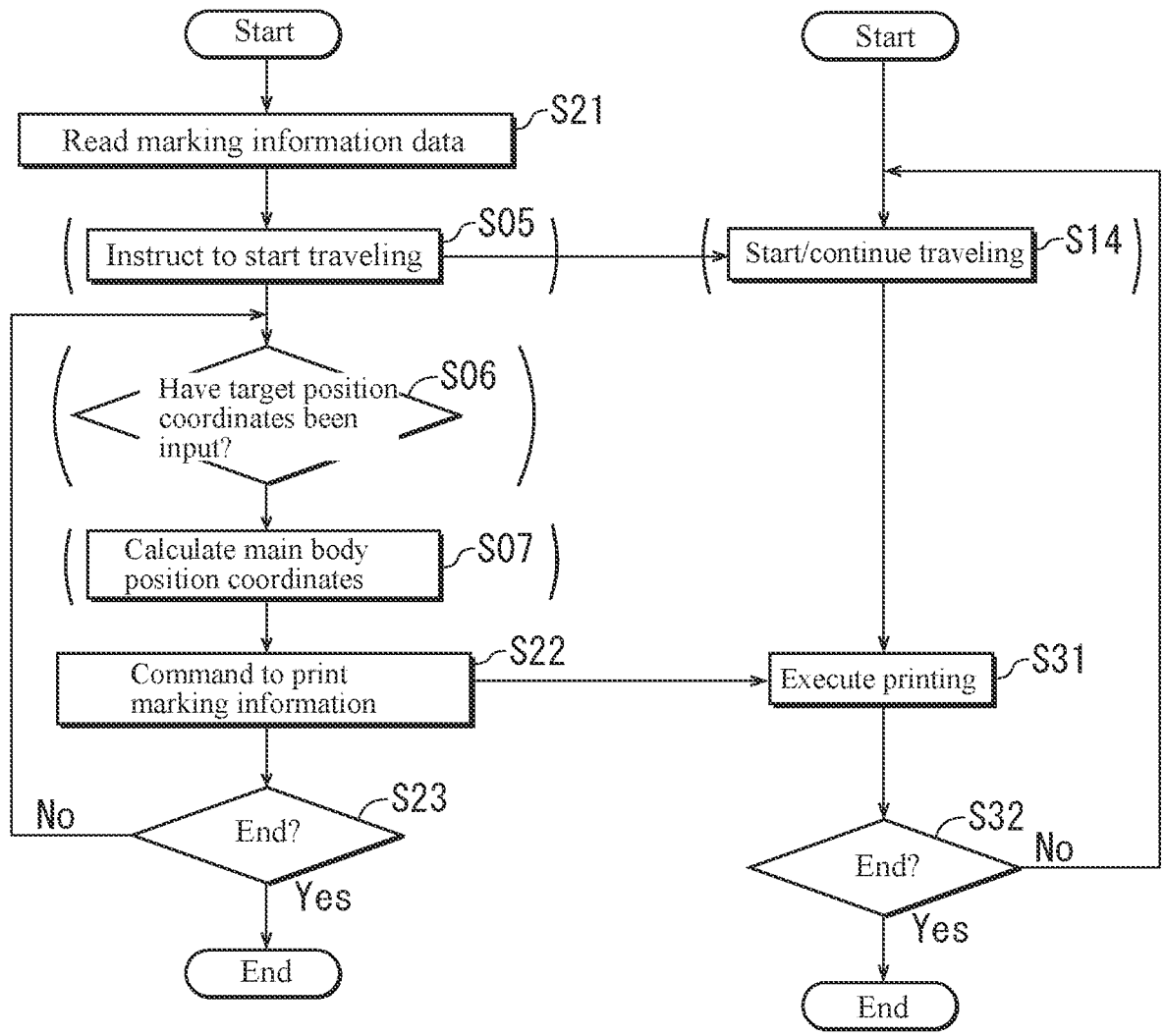
FIG. 5 is a flowchart of processing of the marking apparatus in the same marking method.

FIG. 5 is a flowchart describing processing related to print control of the marking apparatus 1. This processing is performed mainly by the marking data reading unit 43, the print command unit 45 and the print control unit 25 simultaneously with the processing of traveling control, and partially includes common steps.

First, when the processing starts, in Step S21, the marking data reading unit 43 of the controller 4 reads the marking information data 53*b* from the storage unit 53.

In traveling processing, when traveling starts, at predetermined intervals, the surveying instrument 6 performs distance and angle measurements of the target T and transmits target position coordinates to the controller 4. The apparatus main body 2 outputs a detection value of the tilt sensor 35 to the controller 4 at timings synchronized with the distance and angle measurements of the target T.

In the processing of traveling control, a start of traveling is instructed in Step S05, target position coordinates are input in Step S06, and apparatus main body position coordinates are calculated by the traveling correction command unit 44 in Step S07. Next, in Step S22, the print command unit 45 that has detected the calculation of the apparatus main body position coordinates commands the apparatus main body 2 to print marking information of the marking information data 53*b* corresponding to the apparatus main body position coordinates.

Subsequently, in the apparatus main body 2, according to a print command input in Step S31, the print control unit 25 controls the printer 32 to print marking information onto a two-dimensional region along a traveling direction, defined by the printer head 32*a* on the traveling surface and traveling of the apparatus main body 2. FIGS. 7A to 7C illustrate examples of marking information (marks M) printed on the traveling surface. FIG. 7A illustrates an example of a straight line such as a base line, a relief line. FIG. 7B illustrates an example of printing of a crossline as a pillar centerline in addition to the straight line, and FIG. 7C illustrates an example of printing of a symbol and characters of related information in addition to the straight line.

Subsequently, until an instruction to end traveling is given in Steps S23, S31, printing of the marking information onto the traveling surface is performed by repeating Steps S06 to S23 and Steps S14 to S32.

5. Operation of Surveying Instrument 6

Figure 6:
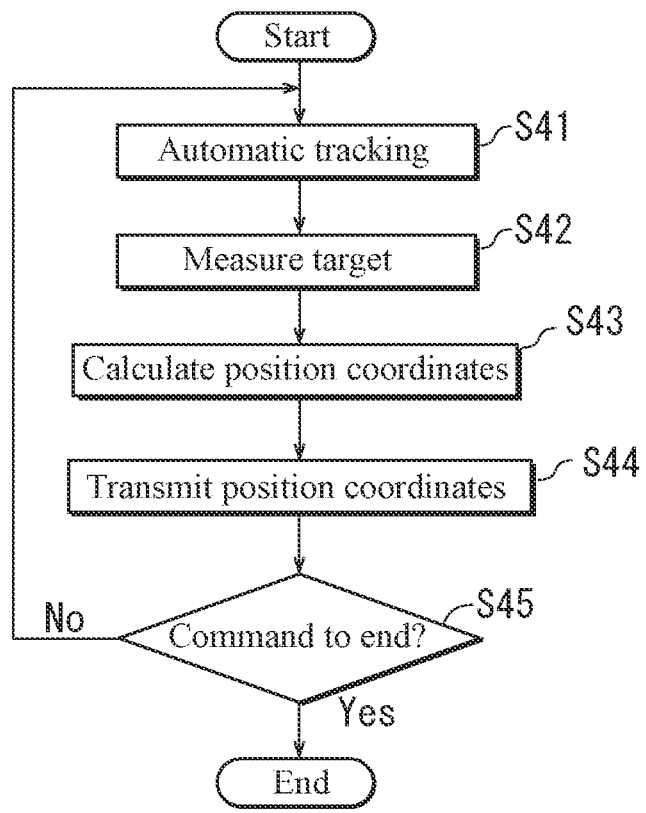
FIG. 6 is a flowchart of processing of a surveying instrument in the same marking method.

FIG. 6 is a flowchart of operation of the surveying instrument 6. In the surveying instrument 6, upon accepting a tracking start command from the controller 4, the automatic tracking unit 76 starts automatic tracking in Step S41.

Next, in Step S42, the surveying instrument 6 measures the target T. Next, in Step S43, the surveying instrument 6 calculates target position coordinates. Next, in Step S44, the surveying instrument 6 transmits the target position coordinates to the controller 4.

Then, in Step S45, until an end command is input from the controller 4, Steps S41 to S45 are repeated.

As described above, in the marking system according to the present embodiment, the marking apparatus main body 2 is configured so as to travel along a traveling route set based on CAD design data 9, and configured to be capable of printing marking information of the marking information data 53*b* generated based on the same CAD design data 9 corresponding to a position of the apparatus main body 2 being traveling. Therefore, for the entire site or within a predetermined range in which the apparatus main body 2 can automatically travel, marking can be automatically performed without the necessity of an additional instruction by a worker.

In particular, in the marking system S according to the present embodiment, the printer 32 having a wide printing width is provided to enable printing onto a two-dimensional region along a traveling direction by collaboration between traveling of the apparatus main body 2 and ink discharge from the printer 32, so that printing to an accurate position can be performed without taking into consideration a traveling time of the printer head in the X-axis direction.

6. Modification 1

Figure 8:
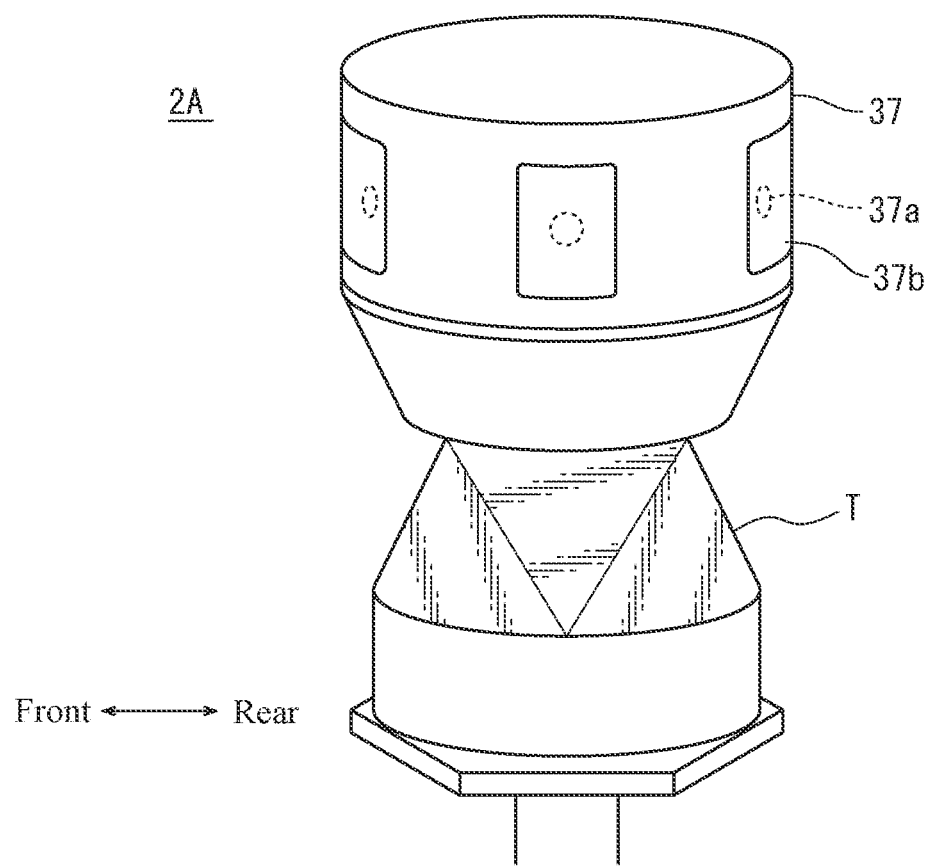
FIG. 8 is a partial external view of a marking apparatus according to a modification of the same embodiment.
Figure 9:
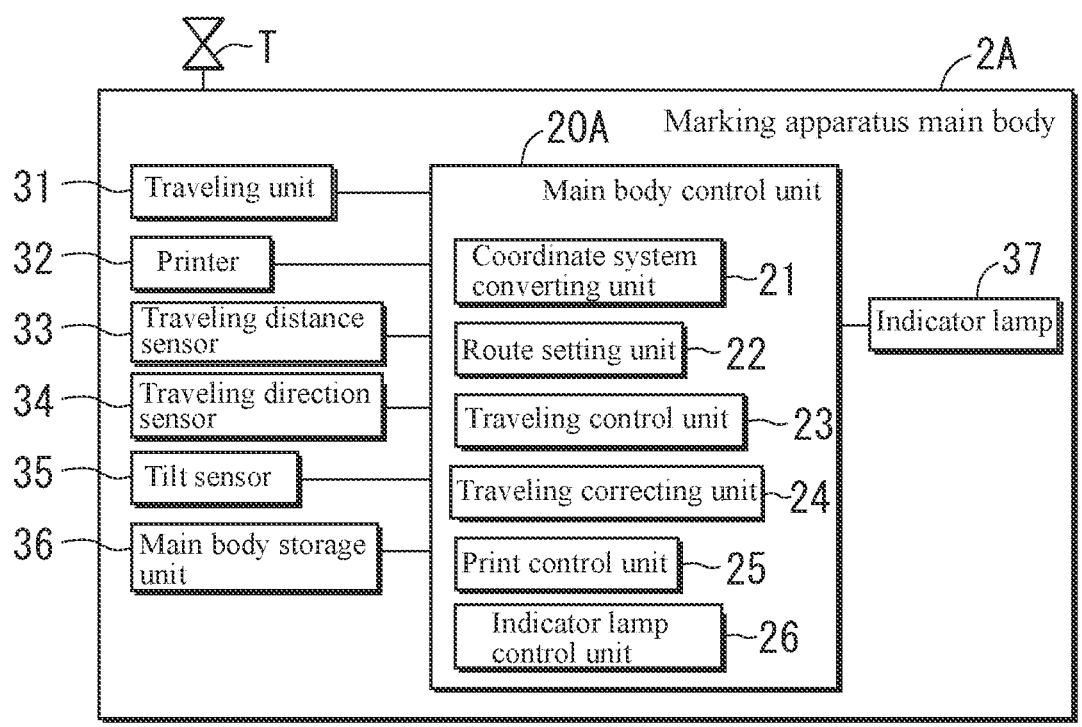
FIG. 9 is a configuration block diagram of a marking apparatus main body according to the same modification.

FIG. 8 is a partial enlarged view of an apparatus main body 2A of a marking system SA (not illustrated) according to a modification of the present embodiment, and FIG. 9 is a configuration block diagram of the apparatus main body 2A. The apparatus main body 2A has generally the same configuration as the apparatus main body 2, but is different in that an indicator lamp 37 is provided on an upper portion of the target T provided at an upper end of the pole 2*b*.

The indicator lamp 37 has a columnar shape attached concentrically to the pole 2*b*, and is provided with light emitting portions on four sides of front, rear, left, and right sides. The light emitting portion is configured by a light source 37*a* such as an LED that emits visible light, a reflector (not illustrated) that reflects light from the light source toward an irradiation direction, and a translucent cover 37*b*.

A main body control unit 20A includes an indicator lamp control unit 26 in addition to the functional units of the main body control unit 20.

The indicator lamp control unit 26 controls light emissions of the light sources so that the apparatus main body 2A indicates a traveling direction. That is, light emissions are controlled so that when traveling forward, the front light emitting portion is turned on or flashes, when turning left, the left light emitting portion is turned on or flashes, when turning right, the right light emitting portion is turned on or flashes, and when traveling backward, the rear light emitting portion is turned on or flashes.

According to the configuration described above, even when a work environment is dark such as at night, etc., a position of the apparatus main body 2A can be easily confirmed by a worker. In addition, for example, when moving to a start point of a next route after the previous route ends, a worker around the apparatus cannot predict which direction the apparatus main body 2A is going to travel, however, by providing the indicator lamp 37, a worker around the apparatus can be notified of the direction, so that the worker around the apparatus can be prevented from becoming an obstacle to traveling.

7. Modification 2

Figure 10:
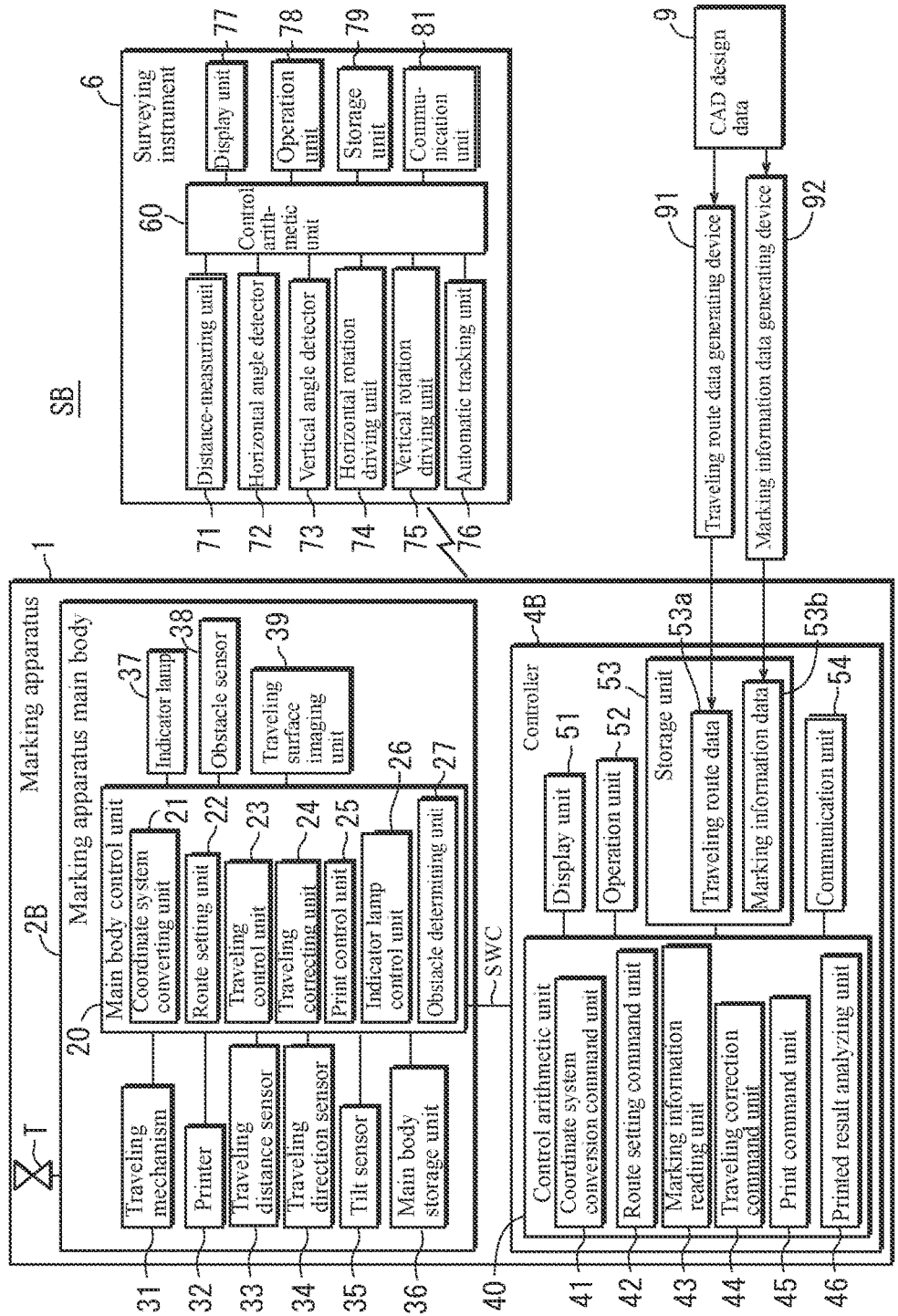
FIG. 10 is a configuration block diagram of a marking apparatus according to another modification.
Figure 11A:
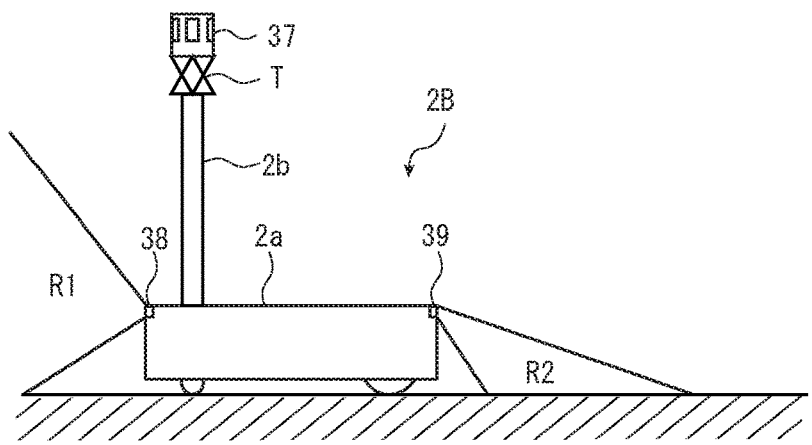
FIGS. 11A, 11B, 11C, 11D, and 11E are diagrams describing a configuration and a function of the marking apparatus according to the same modification.

FIG. 10 is a configuration block diagram of a marking apparatus 1B of a marking system SB according to another modification of the present embodiment. FIG. 11A is a side schematic view of an apparatus main body 2B of the marking apparatus 1B. The apparatus main body 2B has the same basic configuration as the apparatus main body 2A, but further includes an obstacle sensor 38 and a traveling surface imaging unit 39.

The obstacle sensor 38 is a camera including, for example, an image pickup device such as a CMOS (Complementary MOS), CCD (Charge-Coupled Device), etc., and takes an image of a region R1 in front of the apparatus main body 2 at predetermined intervals.

The main body control unit 20B further includes an obstacle determining unit 27. By dividing a captured image by the obstacle sensor 38 into several areas and detecting a focal position for each area, the obstacle determining unit 27 obtains distances between the camera and the respective areas on the image surface. Accordingly, 3D geometry is three-dimensionally recognized from two-dimensional distance measurement data of the image surface to detect an obstacle. Upon detecting an obstacle, the obstacle determining unit 27 controls the traveling control unit 23 to stop traveling. It is also possible that, at the same time, a warning of the presence of the obstacle may be issued by, for example, flashing the front, rear, left, and right light emitting portions in order in a rotation direction by controlling the indicator lamp 37.

It is also possible that, at the same time, the fact that the apparatus main body has stopped due to the obstacle is displayed on the display unit 51 of the controller 4B to notify a worker operating the controller 4B of the stoppage due to the obstacle. Accordingly, the worker becomes aware of the abnormality of the apparatus main body 2B, and can take appropriate measures such as removing the obstacle and continuing printing, postponing printing onto the current portion or after moving to a start point of a next route, continuing printing.

The traveling surface imaging unit 39 is a camera including an image pickup device such as a CMOS, CCD, etc., and is provided at a rear portion of the apparatus main body 2B and takes images P (FIG. 11C) of a region R2 on the traveling surface behind the apparatus main body 2B and outputs the images to the controller 4B.

A control arithmetic unit 40B of the controller 4B includes a printed result analyzing unit 46 in addition to the configuration of the control arithmetic unit 40.

Figure 11B:
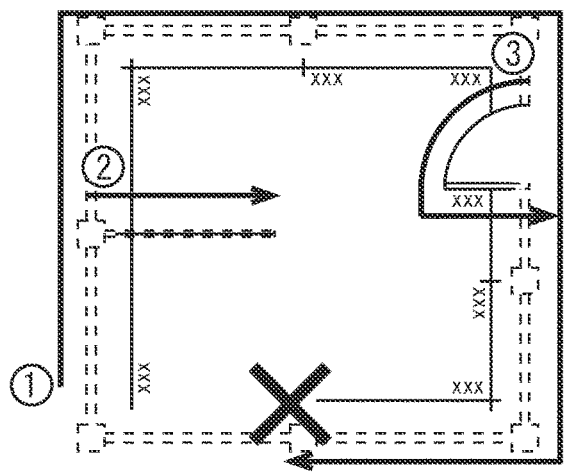
Figure 11C:
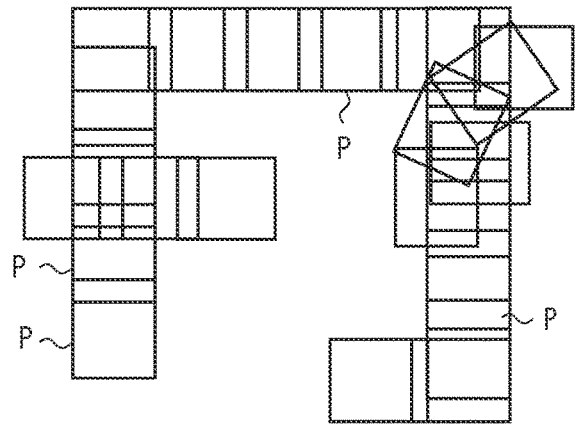
Figure 11D:
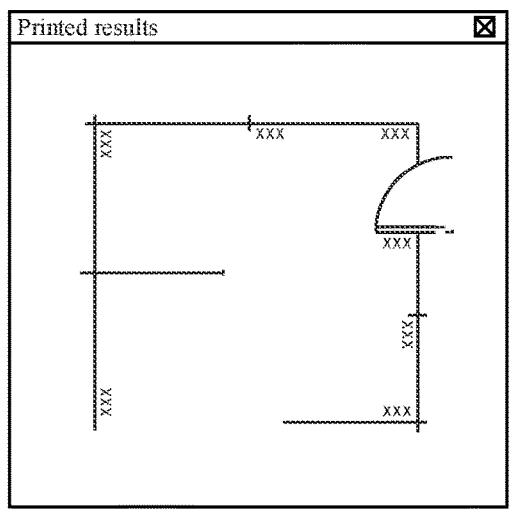

The printed result analyzing unit 46 organizes images P of the traveling surface input from the traveling surface imaging unit 39 and reassembles the images as an image of the entire traveling region of the marking work to generate a printed result image (FIG. 11D). The printed result image can be displayed on the display unit 51. It is also possible that a comparison image (FIG. 11E) between the marking information data 53b and the printed result image is generated, and a different portion is displayed so as to be recognized as a portion that was not correctly printed.

As described above, by providing the obstacle sensor 38, traveling of the apparatus main body 2B can be stopped before colliding with an obstacle, so that the apparatus main body 2B can be prevented from colliding with an obstacle and being broken.

In addition, a worker is notified of a stopped state caused by an obstacle by using an indicator lamp or the display unit 51 of the controller 4B according to detection results of the obstacle sensor 38, so that the notified worker can take a measure such as removing the obstacle immediately, or postponing printing at the current position and restarting printing from a different start point.

When a configuration is made so that images acquired by the traveling surface imaging unit 39 are organized to generate printed result image data, without walking around the site, a printed result of the entire marking region can be confirmed on the display unit 51 of the controller 4, so that the burden on the worker is alleviated.

Figure 11E:
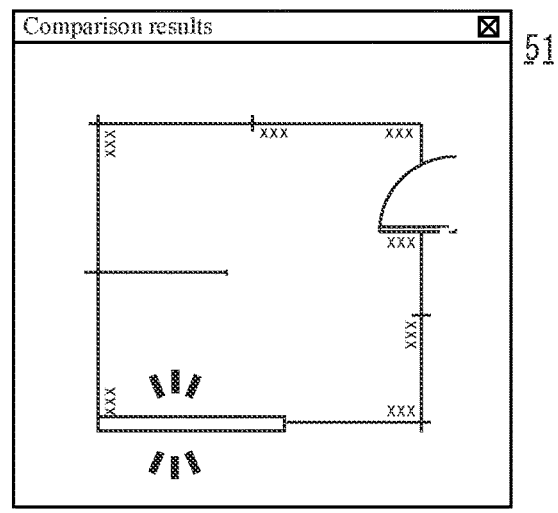

As an example, when performing marking on routes represented by circled numbers 1, 2, and 3 as illustrated in FIG. 11B, a case where an obstacle is found at a large cross mark position on the route 1, and then printing is restarted from the route 2, will be described. Images P in this case are acquired as illustrated in FIG. 11C. The printed result analyzing unit 46 organizes the images P, and accordingly displays printed results with respect to the entire traveling region on the display unit 51 as image data like a printed result image illustrated in FIG. 11D. It is also possible that, as illustrated in FIG. 11E, comparison data obtained by comparing the printed result with the marking information data 53b is created, and a portion that was not printed according to the marking information data 53b is displayed so as to be emphasized by flashing, etc.

A preferred embodiment and modifications of the present invention have been described above, and the embodiment and modifications described above are just examples of the present invention, and can be combined based on the knowledge of a person skilled in the art, and such a combined embodiment is also included in the scope of the present invention.

REFERENCE SIGNS LIST 1, 1B: Marking apparatus
2, 2A, 2B: Apparatus main body
9: CAD design data
31: Traveling mechanism
32: Printer
33: Traveling distance sensor
34: Traveling direction sensor
37: Indicator lamp
53a: Traveling route data
53b: Marking information data
T: Target

The invention claimed is:

1. A marking apparatus comprising:
a marking apparatus main body including a target, a traveling mechanism for automatically traveling on a traveling surface, and a printer configured to print marking information onto the traveling surface; and
a control unit including at least a processor and a memory, the control unit configured to control the printer and the traveling mechanism, wherein
the control unit controls the traveling mechanism so that the traveling mechanism automatically travels along a set traveling route,
the control unit compares position coordinates of the marking apparatus main body obtained from three-dimensional position coordinates of the target during traveling input at predetermined intervals with the traveling route, and corrects traveling to eliminate a deviation from the traveling route,
the control unit controls the printer so as to print the marking information set at a position corresponding to the position coordinates of the marking apparatus main body, and
traveling route data setting the traveling route and marking information data defining the marking information are created based on CAD (Computer Aided Design) design data.

2. The marking apparatus according to claim 1, wherein the printer has a wide printing width extending in a direction orthogonal to a traveling direction of the marking apparatus main body, and prints the marking information onto a two-dimensional region along the traveling direction while traveling by collaboration with driving of the traveling mechanism.

3. The marking apparatus according to claim 2, wherein the marking apparatus main body further includes an indicator lamp configured to irradiate light indicating a traveling direction of the marking apparatus main body.

4. The marking apparatus according to claim 2, wherein the marking apparatus main body includes an obstacle sensor configured to detect an obstacle in a traveling direction, and
the control unit stops driving of the traveling mechanism when the obstacle sensor detects an obstacle.

5. The marking apparatus according to claim 2, wherein
the marking apparatus main body includes an imaging unit configured to image a traveling surface at a rear side of a traveling direction at predetermined intervals, and
the control unit organizes images of the traveling surface to generate a printed result image of the entire traveling region.

6. A marking system comprising:
the marking apparatus according to claim 2; and
a surveying instrument configured to emit measuring light to the target and receive reflected light to measure a distance and an angle to the target so as to calculate the three-dimensional position coordinates of the target, and to output to the marking apparatus.

7. The marking apparatus according to claim 1, wherein the marking apparatus main body further includes an indicator lamp configured to irradiate light indicating a traveling direction of the marking apparatus main body.

8. The marking apparatus according to claim 7, wherein
the marking apparatus main body includes an obstacle sensor configured to detect an obstacle in a traveling direction, and
the control unit stops driving of the traveling mechanism when the obstacle sensor detects an obstacle.

9. The marking apparatus according to claim 7, wherein
the marking apparatus main body includes an imaging unit configured to image a traveling surface at a rear side of a traveling direction at predetermined intervals, and
the control unit organizes images of the traveling surface to generate a printed result image of the entire traveling region.

10. A marking system comprising:
the marking apparatus according to claim 7; and
a surveying instrument configured to emit measuring light to the target and receive reflected light to measure a distance and an angle to the target so as to calculate the three-dimensional position coordinates of the target, and to output to the marking apparatus.

11. The marking apparatus according to claim 1, wherein
the marking apparatus main body includes an obstacle sensor configured to detect an obstacle in a traveling direction, and
the control unit stops driving of the traveling mechanism when the obstacle sensor detects an obstacle.

12. The marking apparatus according to claim 11, wherein
the marking apparatus main body includes an imaging unit configured to image a traveling surface at a rear side of a traveling direction at predetermined intervals, and
the control unit organizes images of the traveling surface to generate a printed result image of the entire traveling region.

13. A marking system comprising:
the marking apparatus according to claim 11; and
a surveying instrument configured to emit measuring light to the target and receive reflected light to measure a distance and an angle to the target so as to calculate the three-dimensional position coordinates of the target, and to output to the marking apparatus.

14. The marking apparatus according to claim 1, wherein
the marking apparatus main body includes an imaging unit configured to image a traveling surface at a rear side of a traveling direction at predetermined intervals, and
the control unit organizes images of the traveling surface to generate a printed result image of the entire traveling region.

15. A marking system comprising:
the marking apparatus according to claim 14; and
a surveying instrument configured to emit measuring light to the target and receive reflected light to measure a distance and an angle to the target so as to calculate the three-dimensional position coordinates of the target, and to output to the marking apparatus.

16. A marking system comprising:
the marking apparatus according to claim 1; and
a surveying instrument configured to emit measuring light to the target and receive reflected light to measure a distance and an angle to the target so as to calculate the three-dimensional position coordinates of the target, and to output to the marking apparatus.

17. A control method for a marking apparatus including a marking apparatus main body including a target, a traveling mechanism for traveling on a traveling surface, and a printer configured to print a mark and information related to the mark onto the traveling surface, and a control unit including at least a processor and a memory, the control unit configured to control the printer and the traveling mechanism, wherein
the control unit controls the traveling mechanism so that the traveling mechanism travels along a set traveling route,
the control unit compares position coordinates of the marking apparatus main body obtained from three-dimensional position coordinates of the target during traveling with the traveling route, and corrects traveling to eliminate a deviation from the traveling route,
the control unit controls the printer so as to print the marking information set at a position corresponding to the position coordinates of the marking apparatus main body, and
traveling route data setting the traveling route and marking information data defining the marking information are created based on CAD design data.

18. A storage medium comprising a program for causing a computer that is the control unit of the marking apparatus to perform the control method for a marking apparatus according to claim 17.

* * * * *